United States Patent
Gillis et al.

(10) Patent No.: US 8,967,085 B2
(45) Date of Patent: Mar. 3, 2015

(54) ELECTRONIC PET GATE

(71) Applicant: Radio System Corporation, Knoxville, TN (US)

(72) Inventors: Greg Gillis, Redding, CA (US); Scott MacFarland, Knoxville, TN (US); Keith Griffith, Oneida, TN (US)

(73) Assignee: Radio Systems Corporation, Knoxville, TN (US)

( * ) Notice: Subject to any disclaimer, the term of this patent is extended or adjusted under 35 U.S.C. 154(b) by 193 days.

(21) Appl. No.: 13/844,411

(22) Filed: Mar. 15, 2013

(65) Prior Publication Data

US 2014/0261234 A1    Sep. 18, 2014

(51) Int. Cl.
*A01K 15/04*    (2006.01)
*A01K 15/02*    (2006.01)
*A01K 1/00*     (2006.01)

(52) U.S. Cl.
CPC .............. *A01K 15/021* (2013.01); *A01K 1/0017* (2013.01)
USPC .......................................... 119/721; 119/484

(58) Field of Classification Search
USPC ................. 119/712, 719–721, 908, 905, 484; 340/573.3, 561, 564
See application file for complete search history.

(56) References Cited

U.S. PATENT DOCUMENTS

| | | | |
|---|---|---|---|
| 3,184,730 A * | 5/1965 | Irish | 340/564 |
| 3,500,373 A * | 3/1970 | Minasy | 340/572.4 |
| 4,783,646 A * | 11/1988 | Matsuzaki | 340/572.5 |
| 4,969,418 A * | 11/1990 | Jones | 119/712 |
| 5,207,179 A | 5/1993 | Arthur | |
| 6,075,443 A | 6/2000 | Schepps | |
| 6,833,790 B2 | 12/2004 | Mejia | |
| 7,114,466 B1 * | 10/2006 | Mayer | 119/720 |
| 7,828,221 B2 | 11/2010 | Kwon | |
| 8,240,085 B2 | 8/2012 | Hill | |
| 2002/0092481 A1 * | 7/2002 | Spooner | 119/908 |
| 2014/0053788 A1 * | 2/2014 | Riddell | 119/712 |
| 2014/0069350 A1 * | 3/2014 | Riddell | 119/712 |

\* cited by examiner

*Primary Examiner* — Kristen C Hayes
(74) *Attorney, Agent, or Firm* — Merchant & Gould, PC

(57) ABSTRACT

An electronic pet gate. The electronic pet gate includes a gate transmitter generating a barrier field and a gate receiver generating a deterrent stimulus in the presence of the barrier field. The gate transmitter includes a loop antenna in a low profile elongated sill and a barrier signal generator. The loop antenna transmits the barrier signal and has an elongated geometric shape configured to shape the radiated electromagnetic field into a truncated ellipsoid. The truncated ellipsoidal barrier field has significant field strength along the length of the low profile sill and minimal field strength along the sides of the low profile sill. The low profile sill is designed to securely rest on the floor to block access to an area restricted to a pet without being a substantial physical impediment or hazard to people passing over low profile sill.

20 Claims, 8 Drawing Sheets

ELECTRONIC PET GATE

BACKGROUND

One option for a pet owner desiring to keep a pet in or out of a specific area of a home is to use a physical barrier, such as a baby gate. However, a baby gate has a number of limitations making it less than ideal for the task. There are some locations where a baby gate cannot be installed because the passageway is too large or there are simply no suitable attachment points. A baby gate is often unsightly, awkward to use, and unnecessarily impedes passage for everyone, not just the pet. Further, pets have been known to knock down, jump over, or chew through baby gates.

Another option for a pet owner desiring to keep a pet in or out of a specific area of a home is to use a proximity triggered system that emits an audible or spray deterrent when an animal approaches a detector unit located near the restricted area. Many such proximity triggered systems use passive or active optical sensors (e.g., infrared) and/or ultrasonic sensors to detect when an animal approaches the restricted area. Proximity triggered systems are generally inaccurate, prone to false activation, and indiscriminate in their application of the deterrent.

A third option for a pet owner desiring to keep a pet in or out of a specific area of a home is to use an electronic animal exclusion system including a transmitter sending signal and a stimulus unit worn by the pet that delivers a stimulus in response to the transmitter signal. Such electronic animal exclusion systems are not without their disadvantages. Placement of the electronic animal exclusion system transmitter is critical for proper electromagnetic field distribution. Being derived from electronic animal containment systems designed for outdoor use, currently available electronic animal exclusion systems produce a substantially spherical electromagnetic field with a diameter that is adjustable between approximately 1.8 m (6 ft) and 3.7 m (12 ft). Even at the lowest setting, the coverage area is often wider, taller, and/or deeper than the pet owner desires making it difficult to place the unit to cover the restricted area without inadvertently covering an area where the pet is allowed. This problem is exacerbated because the transmitter from a conventional electronic animal exclusion system is generally placed to the side of the door to be blocked rather centered in the door jamb where it would be a trip hazard. In such a case, the electromagnetic field must be increased to cover the entire width of the door increasing the chance that access to a permitted area will also be blocked. It was with these problems in mind that the present invention was conceived.

BRIEF SUMMARY

Embodiments of the present invention may provide for an electronic pet gate including a gate transmitter 102 generating a barrier field and a gate receiver 106 worn by a pet 108. The primary structural component of the gate transmitter is a sill 104. The sill 104 is an elongated structural member with a low profile designed to be routinely traversed without presenting a substantial physical impediment or hazard to people, objects, or unrestricted animals passing over the sill. In addition to the sill, the gate transmitter includes a barrier signal generator and a loop antenna. In various embodiments, the sill carries or encloses the barrier signal generator and the loop antenna. In other embodiments, the sill carries or encloses the loop antenna and the barrier signal generator is externally located. In various embodiments, the loop antenna is a conductive wire configured as a loop antenna.

The barrier signal generator generates a barrier signal that is output to the loop antenna. The loop antenna broadcasts the barrier signal to produce the barrier field. The barrier field is a radio frequency electromagnetic field. The shape of the barrier field is controlled by the shape of the loop antenna. A frame imposes a polygonal shape on the loop antenna.

In various embodiments, the coil layout is framed using a continuous channel defined by the sill. In some embodiments, the coil layout is framed using multiple positioners (e.g., pegs) arranged within an open cavity defined by the sill. The loop antenna is wrapped around the positioners to obtain a polygonal shape. In other embodiments, a framed loop antenna is fabricated by positioning the loop antenna in a selected polygonal shape and forming a frame around the loop antenna, for example by molding. The framed loop antenna is then attached to the sill. FIG. 5 illustrates an embodiment with one such framed loop antenna positioned in an open cavity defined by the sill. Similarly, in some embodiments, a polygonal shaped loop antenna fabricated by securing the loop antenna to or wrapping the loop antenna around a pre-formed polygonal shaped frame.

The electronic pet gate shapes the barrier field to mimic the elongated shape of the sill by modifying the geometry (i.e., coil layout) of the loop antenna. The coil layouts are generally defined by a pair of longitudinal segments connected at each end by a lateral transition. For each coil layout, the length of the primary longitudinal segments is substantially longer than longitudinal length component of the lateral transition. The barrier field is predominantly focused along the longitudinal edges of the sill to provide an effective barrier across a linear threshold while minimizing any barriers to surrounding areas by controlling the localized field strength reductions through the coil layout. The barrier field strength at the ends of the sill is varied by adjusting the characteristics of the polygon used for the coil layout. The polygonal coil layouts have a large longitudinal segment length to lateral transition length ratios. Each of the various coil layouts produces an ellipsoidal electromagnetic field due to the large longitudinal segment length to lateral transition length ratio; however, the variations in geometry introduce localized reductions in field strength that alter the effective shape of the barrier field. While the more desirable shapes for the barrier field are those that most closely mimic the elongated perimeter of the sill because such barrier fields provide the desired gate function to block the pet from accessing the restricted area without blocking the pet's access to surrounding areas where the pet is permitted, the electronic pet gate should not be construed as being limited to the coil layouts or barrier field shapes described herein.

The details of one or more embodiments are set forth in the accompanying drawings and description below. Other features and advantages will be apparent from a reading of the following detailed description and a review of the associated drawings. It is to be understood that the following detailed description is explanatory only and is not restrictive of the invention as claimed.

BRIEF DESCRIPTION OF THE DRAWINGS

Further features, aspects, and advantages of the invention represented by the embodiments described present disclosure will become better understood by reference to the following detailed description, appended claims, and accompanying figures, wherein elements are not to scale so as to more clearly show the details, wherein like reference numbers indicate like elements throughout the several views, and wherein:

DETAILED DESCRIPTION

An electronic pet gate is described herein and illustrated in the accompanying figures. The electronic pet gate includes a gate transmitter generating a barrier field and a gate receiver generating a deterrent stimulus in the presence of the barrier field. The gate transmitter includes a loop antenna in a low profile elongated sill and a barrier signal generator. The loop antenna transmits the barrier signal and has an elongated geometric shape configured to shape the radiated electromagnetic field into a truncated ellipsoid. The truncated ellipsoidal barrier field has significant field strength along the length of the low profile sill and minimal field strength along the sides of the low profile sill. The low profile sill is designed to securely rest on the floor to block access to an area restricted to a pet without being a substantial physical impediment or hazard to people passing over low profile sill.

Figure 1:
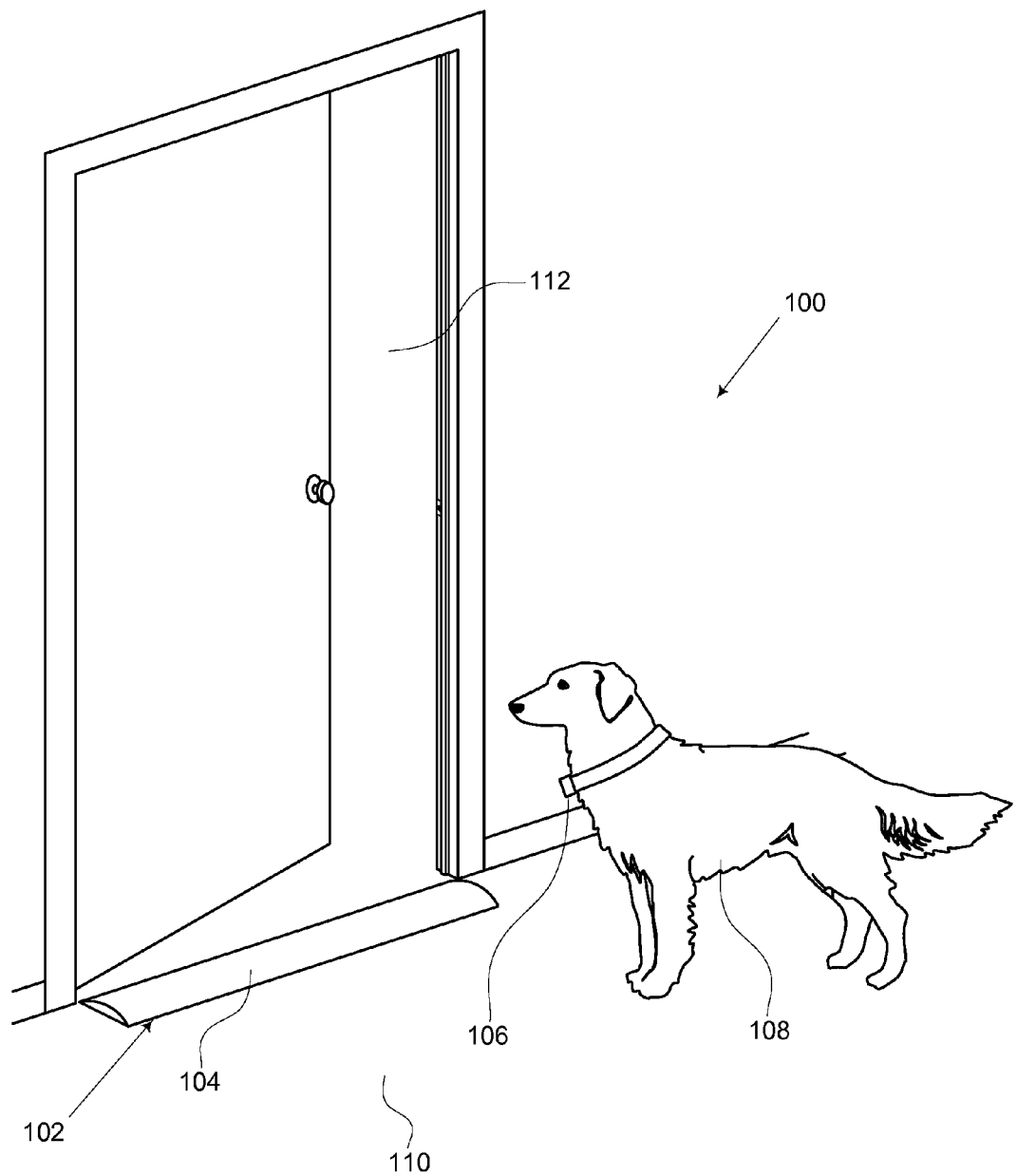
FIG. 1 is an illustration of one embodiment of the electronic pet gate shown in a typical usage environment.

FIG. 1 is an illustration of one embodiment of the electronic pet gate 100 shown in a typical usage environment. The electronic pet gate includes a gate transmitter 102 generating a barrier field and a gate receiver 106 worn by a pet 108. The primary structural component of the gate transmitter is a sill 104. The sill 104 is an elongated structural member with a low profile designed to be routinely traversed without presenting a substantial physical impediment or hazard to people, objects, or unrestricted animals passing over the sill. In various embodiments, the sill is designed to securely rest on a supporting surface 110, such as a floor, to block access to an area 112 restricted to the pet 108. In some embodiments, the low profile sill is securely fastened to the supporting surface 110. In other embodiments, the low profile sill replaces a conventional door threshold.

The sill is generally fabricated from durable materials capable of being repeated stepped on by humans or animals (e.g., domesticated animals) or driven over by cars. Examples of suitable materials include, but are not limited to, plastic, metal, and wood. The sill may be painted or stained to match the décor of the area where it is used. The length of the sill ranges from the width of a small door frame (approximately 0.61 m or 2 ft) to the width of a residential multi-car garage door (approximately 5.5 m or 18 ft). In some embodiments, extensions are available to increase the length of the sill. In still other embodiments, the length of the threshold is adjustable.

Figure 2:
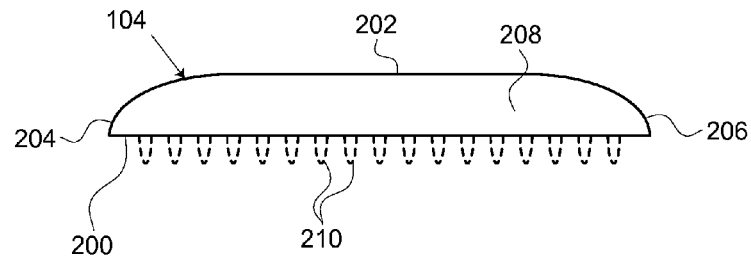
FIG. 2 is a side elevation view of one embodiment of the sill.

FIG. 2 is a side elevation view of one embodiment of the sill 104. The sill 104 defines a bottom surface 200, a top surface 202, a front edge 204, a rear edge 206, and side edges 210. The bottom surface generally rests upon the supporting surface, such as a floor. In the illustrated embodiment, the bottom surface is flat to provide the maximum contact area with the supporting surface. In various embodiments, a fastener holds the sill in place on the supporting surface. The type of fastener used depends upon the duration of the installation (i.e., short term, long term, or permanent), the type of supporting surface (e.g., carpet, hardwood, and concrete), the desired level of positional security, and the acceptability of defacing the supporting surface. The most common types of fasteners suitable for use with the sill are frictional fasteners, adhesive fasteners, and mechanical fasteners. Examples of suitable fasteners include, but are not limited to, non-slip polymer gripper pads, two-sided grip tape, tack strips, nails, and screws. In some embodiments, the fasteners are integrated into the sill. For example, the illustrated embodiment of the sill shows, in phantom, an optional set of projections 210 (i.e., fingers or teeth) extending from the bottom surface to engage the supporting surface. Such projections are particularly well suited for maintaining the position of the sill when deployed on a carpet or rug. In some embodiments, the sill wedged between the door jamb is held in place by compressive forces and/or friction.

The top surface, the front edge, the rear edge define the contour of the exposed face of the sill. The contour is generally selected to minimize the physical obstruction presented by the sill. In other words, the contour is generally selected to not be a trip hazard or otherwise impair passage over the sill. In various embodiments, the top surface and either or both the front edge and the rear edge blend into a single curved or tapered surface. In other embodiments, the top surface and either or both the front edge and the rear edge define distinct surfaces.

Figure 3:
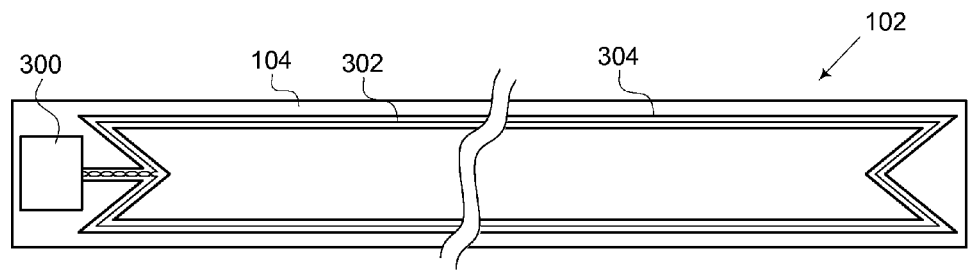
FIG. 3 is a sectional plan view of one embodiment of the sill taken along an arbitrary line parallel to the bottom surface of the sill in which the coil layout is framed using a continuous channel.
Figure 4:
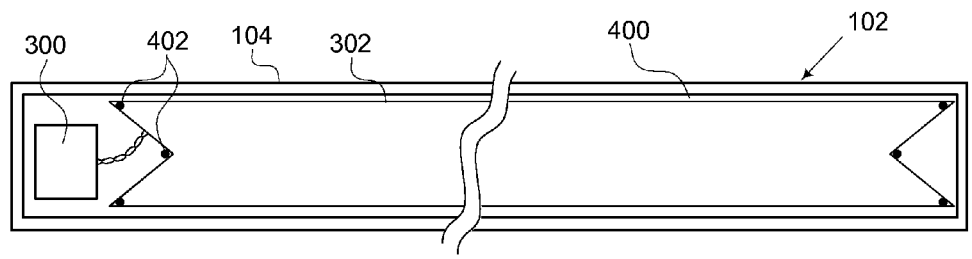
FIG. 4 is a sectional plan view of one embodiment of the sill taken along an arbitrary line parallel to the bottom surface of the sill in which the coil layout is framed using multiple positioners.
Figure 5:
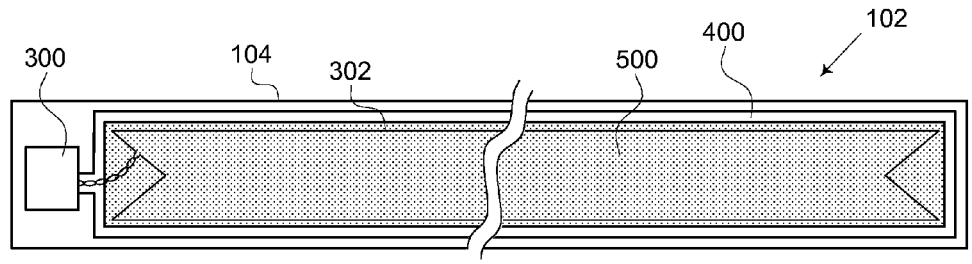
FIG. 5 is a sectional plan view of one embodiment of the sill taken along an arbitrary line parallel to bottom surface of the sill showing an independently framed loop antenna carried by the sill.

FIGS. 3 to 5 are sectional plan views of various embodiments of the gate transmitter taken along an arbitrary line parallel to the bottom surface of the sill 104. In addition to the sill 104, the gate transmitter 102 includes a barrier signal generator 300 and a loop antenna 302. In various embodiments, the sill carries or encloses the barrier signal generator 300 and the loop antenna 302. In other embodiments, the sill carries or enclosures the loop antenna 302 and the barrier signal generator 300 is externally located. In various embodiments, the loop antenna 302 is a conductive wire configured as a loop antenna.

The barrier signal generator 300 generates a barrier signal that is output to the loop antenna 302. The loop antenna 302 broadcasts the barrier signal to produce the barrier field. The barrier field is a radio frequency electromagnetic field. The electronic pet gate 100 shapes the barrier field to mimic the elongated shape of the sill by modifying the geometry (i.e., coil layout) of the loop antenna. A frame imposes a polygonal shape on the loop antenna 302. As used herein, the terms "polygon" and "polygonal" are not limited to strict Euclidian definitions of a polygon and is intended to encompass approximations of polygons that lack the mathematical precision normally attributed to polygons in Euclidian geometry (i.e., generally or substantially polygonal shaped). For example, a polygonal shape is not required to have exact angles, uniform angles, or sharp corners to be suitable for use in the electronic pet gate.

FIG. 3 shows an embodiment where the coil layout is framed using a continuous channel 304 defined by the sill 104. FIG. 4 shows an embodiment where the coil layout is framed using multiple positioners 400 (e.g., pegs) arranged within an open cavity 402 defined by the sill 104. The loop antenna 302 is wrapped around the positioners 400 to obtain a polygonal shape. In other embodiments, a framed loop antenna is fabricated by positioning the loop antenna in a selected polygonal shape and forming a frame around the loop antenna, for example by molding. The framed loop antenna is then attached to the sill. FIG. 5 illustrates an embodiment with one such framed loop antenna 500 positioned in an open cavity defined by the sill. Similarly, in some embodiments, a polygonal shaped loop antenna fabricated by securing the loop antenna to or wrapping the loop antenna around a pre-formed polygonal shaped frame.

In various embodiments, a cover is secured to the sill to prevent the loop antenna from sliding out of the channel or off of the positioners. Examples of suitable techniques for attaching the cover to the sill in a substantially permanent manner include, but are not limited to, overmolding, thermal and/or chemical bonds, and welds. Examples of suitable techniques for attaching the cover to the sill in a temporary manner include, but are not limited to, releasable mechanical fasteners such as screws, hook and loop fasteners, friction fittings, and cooperating mating components. In some embodiments, the cover defines channels mirror the sill channels. In other embodiments, the height of the positioners is greater than the depth as the cavity, and the cover defines openings that receive the ends of the positioners.

The coil layout length ($L_{COIL}$) is the length of the primary longitudinal segments plus the length added by both lateral transitions. The coil layout width ($W_{COIL}$) is the maximum distance between the primary longitudinal segments. A constant coil layout length to width ratio allows meaningful comparison of different coil layouts. One way to characterize different coil layouts is by evaluating the ratio of the longitudinal segment length ($L_{LONG}$) to the length of the lateral transition $L_{TRANS}$. A graphical depiction of the coil layout length ($L_{COIL}$), the coil layout width ($W_{COIL}$), the maximum distance the longitudinal segment length ($L_{LONG}$) and the lateral transition length ($L_{TRANS}$) appears in FIG. 8. The longitudinal segment length to lateral transition length ratios described herein are exemplary and should not be used to limit the scope of the electronic pet gate. For each coil layout, the longitudinal segment length is substantially longer than the lateral transition length.

Figure 6:
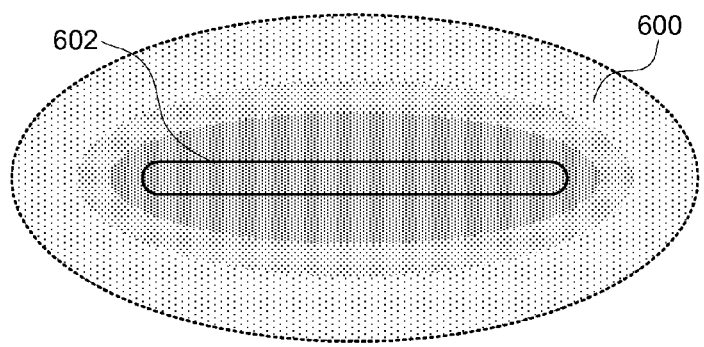
FIG. 6 is a plan view of the field strength cross section for a loop antenna with an elliptical coil layout.
Figure 7:
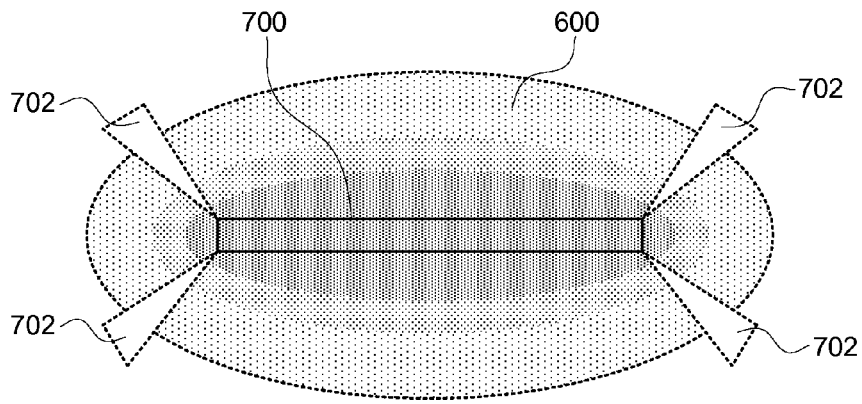
FIG. 7 is a plan view of the field strength cross section for a loop antenna with a rectangular coil layout showing areas where the field strength is reduced compared to the elliptical coil layout.

FIGS. 6 and 7 illustrate the cross sectional field strength for two reference coil layouts. FIG. 6 shows the cross sectional field strength in the reference case of an ellipsoidal barrier field 600 for a common elliptical coil layout 602. The longitudinal segment length to lateral transition length ratio of the elliptical coil layout is approximately 22:1. FIG. 7 shows the cross sectional field strength in another reference case of ellipsoidal barrier field 600 with minimal field strength reduction produced using a common rectangular coil layout 700. Compared to the reference field strength obtained with the elliptical coil layout, the barrier field produced by the rectangular coil layout has a small area 702 exhibiting a modest reduction in field strength projecting from each corner due to the right angles formed between the longitudinal and lateral segments. The longitudinal segment length to lateral transition length ratio is approximately infinity ($\infty$).

FIGS. 8 to 11 illustrate the reductions field strength compared to the ellipsoidal barrier field 600 caused by various polygonal coil layouts. The barrier field is predominantly focused along the longitudinal edges of the sill to provide an effective barrier across a linear threshold while minimizing any barriers to surrounding areas by controlling the localized field strength reductions through the coil layout. The barrier field strength at the ends of the sill is varied by adjusting the characteristics of the polygon used for the coil layout. The polygonal coil layouts have a large longitudinal segment length to lateral transition length ratios. Longitudinal segment length to lateral transition length ratios of approximately 2:1 and greater are suitable for use with the electronic pet gate 100. Each of the various coil layouts produces an ellipsoidal electromagnetic field due to the large longitudinal segment length to lateral transition length ratio; however, the variations in geometry introduce localized reductions in field strength that alter the effective shape of the barrier field.

Figure 8:
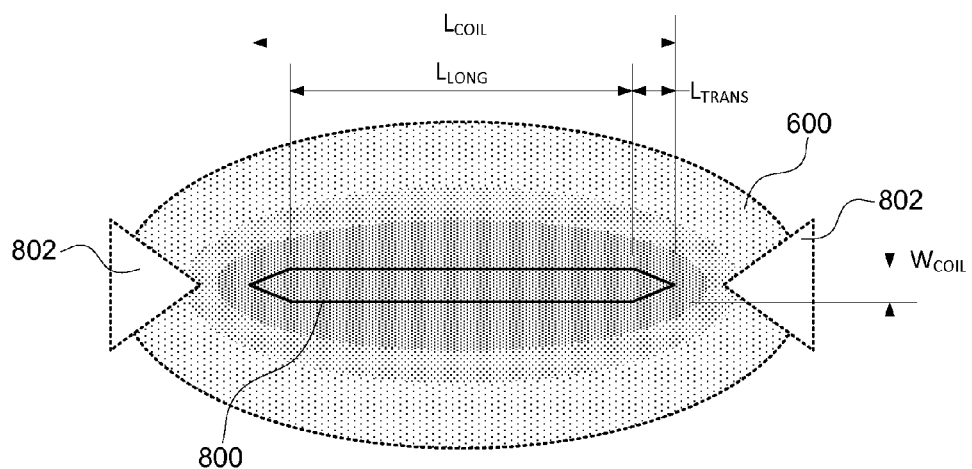
FIG. 8 is a plan view of one embodiment of the loop antenna with a convex hexagonal coil layout showing areas where the field strength is reduced compared to the elliptical coil layout.

FIG. 8 is a plan view of the field strength cross section for a loop antenna with a convex hexagonal coil layout 800. The barrier field produced by the convex hexagonal coil layout has a small area 802 exhibiting a moderate reduction in field strength projecting from each end due to the acute angles formed between the segments of the convex lateral segments. The longitudinal segment length to lateral transition length ratio of the convex hexagonal coil layout is approximately 19:2.5.

Figure 9:
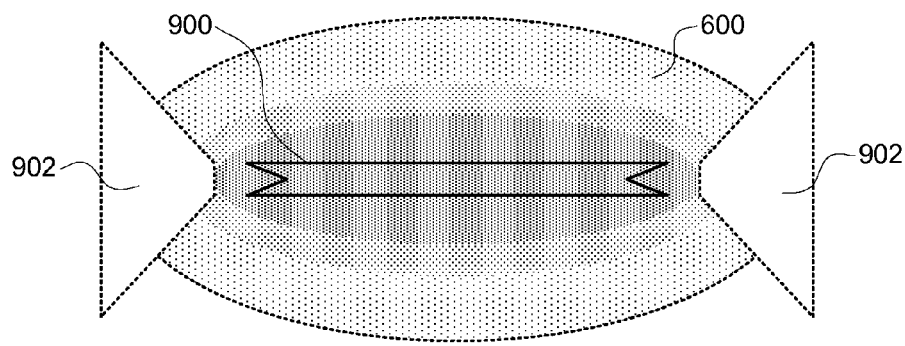
FIG. 9 is a plan view of the field strength cross section for a loop antenna with a simple concave hexagonal coil layout showing areas where the field strength is reduced compared to the elliptical coil layout.

FIG. 9 is a plan view of the field strength cross section for a loop antenna with a simple concave hexagonal coil layout 900. The barrier field produced by the simple concave hexagonal coil layout has a medium area 902 exhibiting a moderate reduction in field strength projecting from each end due to the acute angles formed between the segments of the concave lateral segments between themselves and the longitudinal segments. The simple concave hexagonal coil layout produces a slightly greater field strength reduction than the convex hexagonal coil layout. The longitudinal segment length to lateral transition length ratio of the simple concave hexagonal coil layout is approximately 19:2.5.

Figure 10:
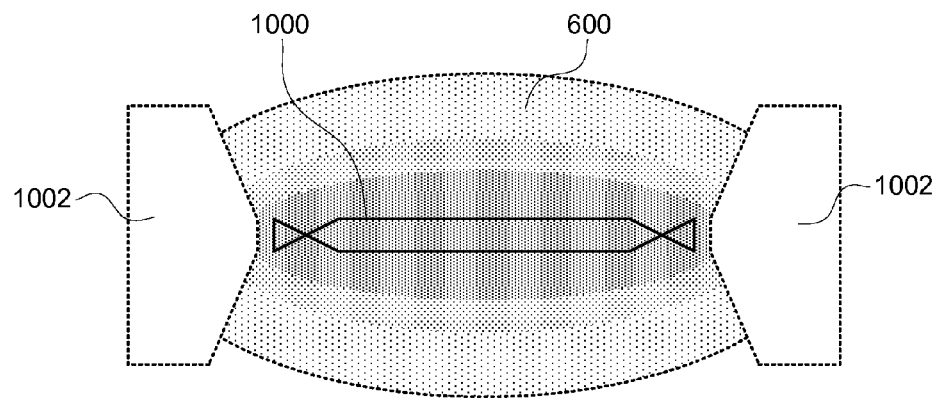
FIG. 10 is a plan view of the field strength cross section for a loop antenna with a triangular twist polygonal coil layout showing areas where the field strength is reduced compared to the elliptical coil layout.

FIG. 10 is a plan view of the field strength cross section for a loop antenna with a triangular twist polygonal coil layout 1000. The triangular twist polygonal coil layout is a self-intersecting polygon. The barrier field produced by the triangular twist polygonal coil layout has a large area 1002 exhibiting a substantial reduction in field strength projecting from each lateral edge due to the barrier field polarity inversion induced by the twists. The triangular twist polygonal coil layout produces a greater field strength reduction than the simple concave hexagonal coil layout. In various embodiments, the longitudinal segment length to lateral transition length ratio of the triangular twist polygonal coil layout is approximately 18:4.

Figure 11:
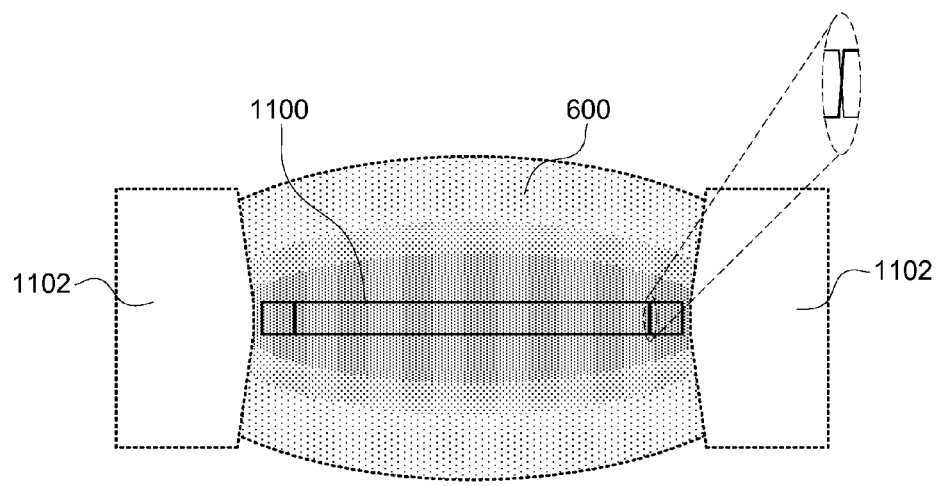
FIG. 11 is a plan view of the field strength cross section for a loop antenna with a box twist polygonal coil layout showing areas where the field strength is reduced compared to the elliptical coil layout.

FIG. 11 is a plan view of the field strength cross section for a loop antenna with a box twist polygonal coil layout 1100. The box twist polygonal coil layout is a self-intersecting polygon with two of the individual segments in each lateral transition lying in a single vertical plane, having vertices at substantially the same coordinates, and running in opposite directions. In other words, the segments overlap. For clarity, an inset depicts the overlapping segments with a slight cant in opposite directions, different line weights, and a slight horizontal offset for the vertices allowing the individual segments to be distinguished. The barrier field produced by the box twist polygonal coil layout has a very large area 1102 exhibiting a substantial reduction in field strength projecting from each lateral edge due to the barrier field polarity inversion induced by the twists. The box twist polygonal coil layout produces a greater field strength reduction than the triangular twist polygonal coil layout. The longitudinal segment length to lateral transition length ratio of the box twist polygonal coil layout is approximately 20:2.

While the more desirable shapes for the barrier field are those that most closely mimic the elongated perimeter of the sill because such barrier fields provide the desired gate function to block the pet from accessing the restricted area without blocking the pet's access to surrounding areas where the pet is permitted, the electronic pet gate 100 should not be construed as being limited to the coil layouts or barrier field shapes described herein.

Figure 12:
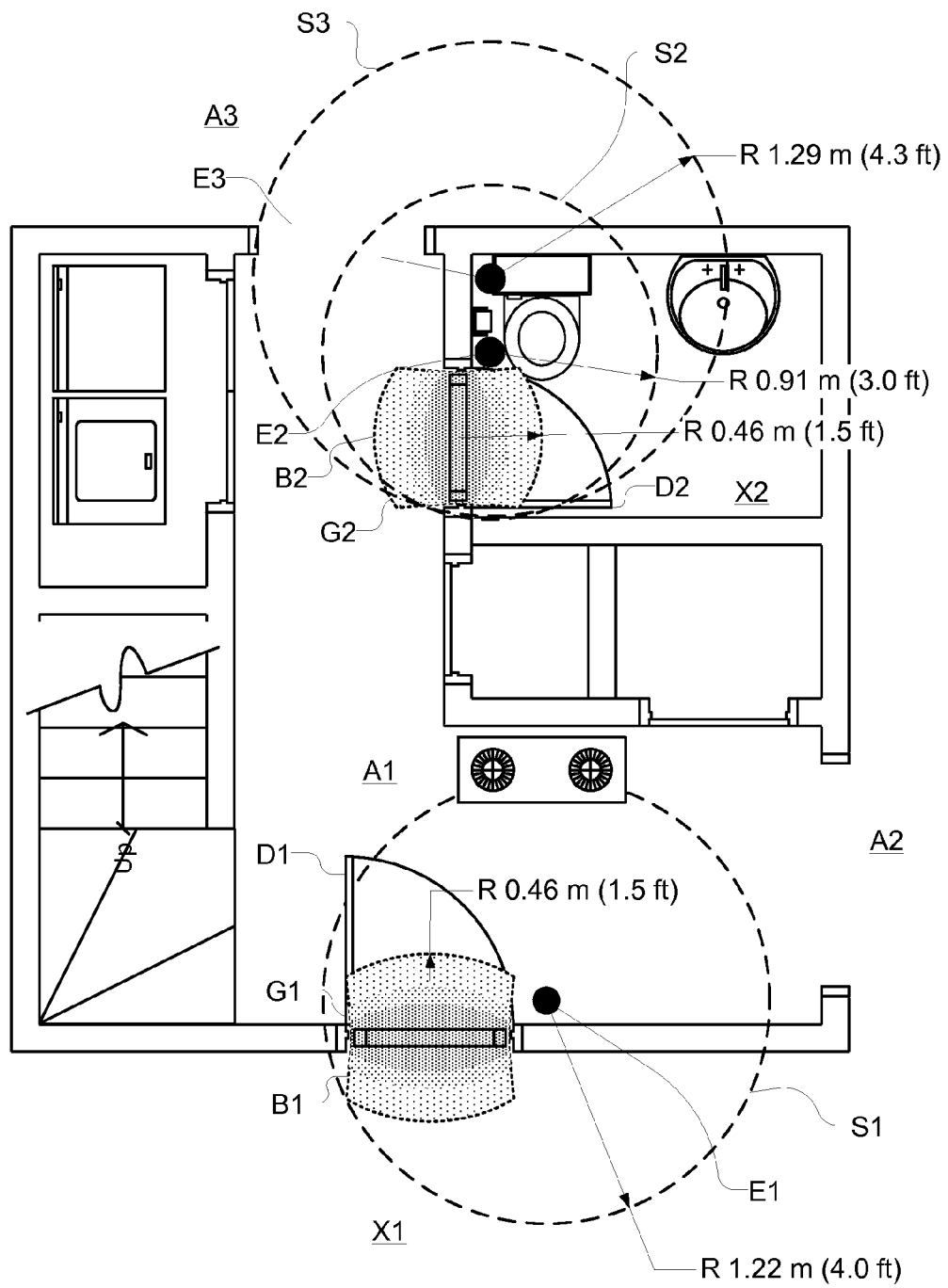
FIG. 12 is a plan view of a home showing electronic pet gates used to control access to various areas.

FIG. 12 is a plan view of a portion of a residential dwelling comparing an embodiment of the electronic pet gate to a conventional electronic animal exclusion system to limit access to restricted areas. To facilitate meaningful visual comparison, FIG. 12 is drawn relatively to scale. The conventional electronic animal exclusion systems produce a substantially spherical barrier field with a typical radius ranging between 0.91 m (3.0 ft) and 3.66 m (12 ft). The electronic pet gate produces a truncated ellipsoidal barrier field with a radius ranging between approximately 0.30 m (1.0 ft) and 0.91 m (3.0 ft) to accommodate different animals of different heights. In FIG. 12, the electronic pet gate is depicted by the box twist polygonal coil layout 1100 from FIG. 11 and a nominal value 0.46 m (1.5 ft) is used for the truncated ellipsoidal barrier field radius.

The first restricted area X1 is the outdoors. For comparison, electronic pet gate G1 and conventional electronic animal exclusion system E1 are shown deployed to prevent a pet from being able to pass through front door D1 without receiving a correction. Conventional electronic animal exclusion system E1 cannot be positioned centrally in the front doorway D1 because it would interfere with the operation of the door and/or present a safety hazard. Instead, conventional electronic animal exclusion system E1 is located to one side of and closely proximate to the front doorway. D1 To fully encompass the front doorway D1, the field strength must be increased until radius of spherical barrier field S1 is larger than the width of the front doorway D1 and the positional offset of electronic animal exclusion system E1 relative to front the doorway D1. For a typical entry door having a width of approximately 0.91 m (3.0 ft), the radius of spherical barrier field S1 is approximately 1.22 m (4.0 ft). As can be seen from FIG. 12, spherical barrier field S1 covers a substantial portion of the entry area and effectively prevents the pet from moving between areas A1 and A2.

Electronic pet gate G1 is located along the threshold of front doorway D1 allowing truncated ellipsoidal barrier field B1 to fully encompass front doorway D1 with a minimal projection into area A1 field strength. Unlike with spherical barrier field B1, the pet has plenty of room to travel between area A1 and A2 while avoiding truncated ellipsoidal barrier field B1 and the associated correction.

The second restricted area X2 is the bathroom. For comparison, an electronic pet gate G2 and conventional electronic animal exclusion systems E2 and E3 are shown deployed to prevent a pet from being able to pass through the bathroom door D2 without receiving a correction. Conventional electronic animal exclusion systems E2 and E3 cannot be positioned in the bathroom doorway D2 because it would interfere with the operation of the door and/or present a safety hazard. Instead, electronic animal exclusion system E2 is positioned to one side and closely proximate to the bathroom doorway D2. To fully encompass bathroom doorway D2, the field strength must be increased until radius of spherical barrier field S2 is larger than the width of bathroom doorway D2 and the positional offset of electronic animal exclusion system E2 relative to bathroom doorway D2. For a typical interior door having a width of approximately 0.76 m (2.5 ft), the radius of spherical barrier field S2 is approximately 1.22 m (4.0 ft). As can be seen from FIG. 12, spherical barrier field S2 covers a substantial portion of area A1 and significantly impairs ability of the pet to move between areas A1 and A3 without receiving an inadvertent correction.

While reducing the field strength required to cover the bathroom doorway D2, this location for electronic animal exclusion system E2 would likely be considered to be in the way by the home owner. Electronic animal exclusion system E3 is shown in an out of the way position (i.e., in the corner) more likely to be considered acceptable by the home owner. The out-of-way position of electronic animal exclusion system E3 necessitates a greater strength for spherical field S3 than needed for spherical field S3 in order to cover the bathroom doorway D2. In the representative floor plan, the spherical field S3 has a radius of approximately 1.29 m (4.3 ft) and extends even more significantly into areas A1 and A3. As can be seen from FIG. 12, spherical barrier field S3 effectively prevents the pet from moving between areas A1 and A3.

Electronic pet gate G2 is located along the threshold of bathroom doorway D2. In contrast to spherical barrier fields S2 and S3, truncated ellipsoidal barrier field B2 completely covers the doorway to restricted area with only limited projection into area A1. The pet has plenty of room to travel between areas A1 and A3 while avoiding truncated ellipsoidal barrier field B2 and the associated correction stimulus.

Figure 13:
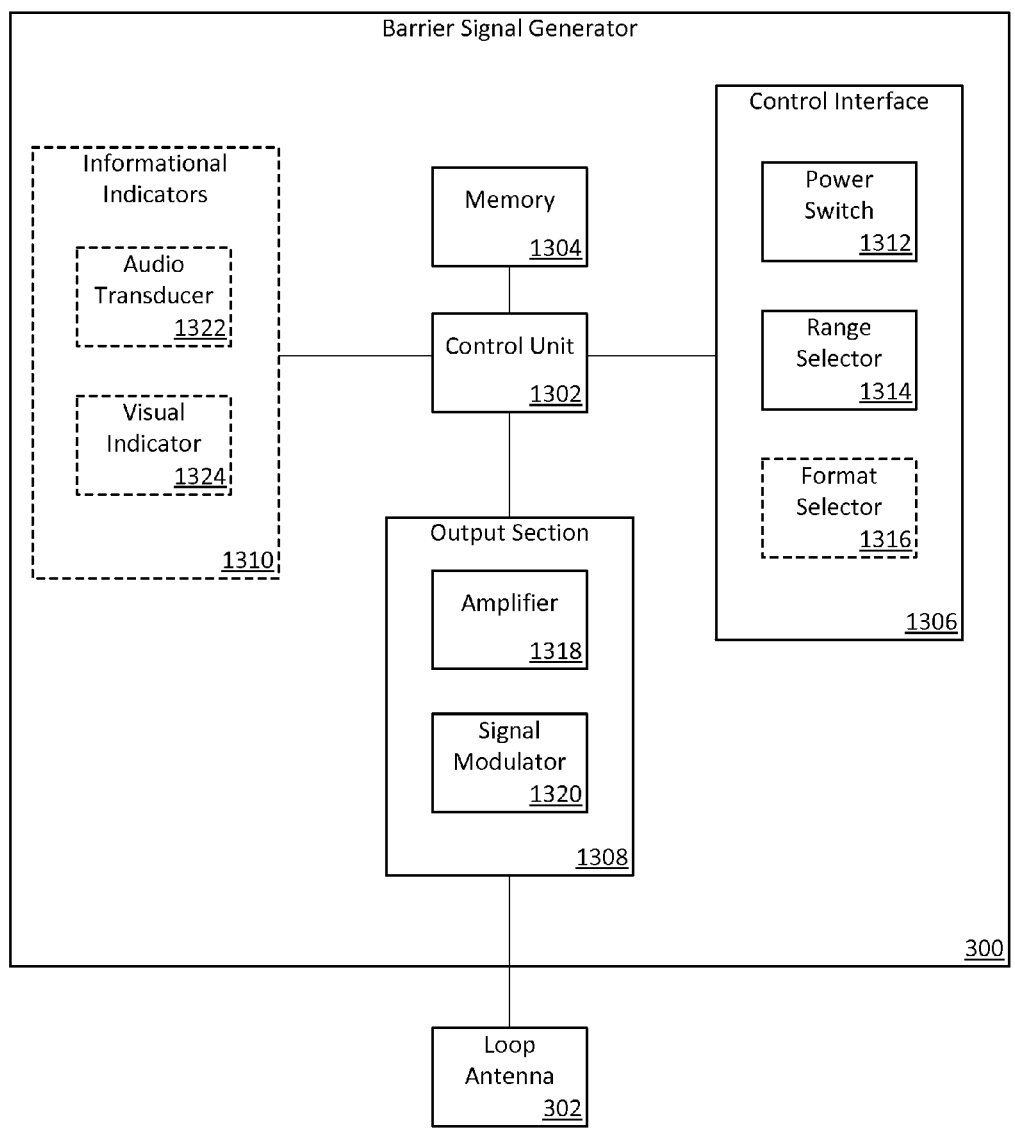
FIG. 13 is a simplified block diagram of one embodiment of the gate transmitter of the electronic pet gate.

FIG. 13 is a simplified block diagram of one embodiment of the circuitry of the gate transmitter 102. The barrier signal generator 300 includes at least one general purpose or application specific control unit 1302, such as a central processing unit or other controller. Examples of suitable control units include, but are not limited to, microprocessors, application specific integrated circuits, field programmable gate arrays, and programmable logic devices. The control unit 1302 provides processing functions for the gate transmitter 102 and, either directly or indirectly, communicates with, drives, and/or receives inputs/feedback from the other components of the barrier signal generator 300. The other components of the barrier signal generator 300 include a memory, 1304, a control interface 1306, a barrier signal generator 1308, any optional informational indicators 1310, and the loop antenna 302.

The memory 1304 provides nonvolatile storage for the gate transmitter firmware and/or software and, in some embodiments, volatile storage for information that does not need to be retained, such as current operating variables. An example of a suitable memory type for nonvolatile storage is random access memory. Examples of suitable types of memory for nonvolatile storage include, but are not limited to, read only memory, programmable read only memory, electrically erasable programmable read only memory, and flash memory.

In various embodiments, the control interface 1306 includes a power switch 1312 and a range selector 1314. In various embodiments, the power switch 1312 is located in a position where and of type that is readily manipulated by the user's foot and allows the user to turn the gate transmitter on and off (i.e., "close" and "open" the gate) without bending over. The range selector 1314 allows the user to adjust the coverage distance and height of the barrier signal to vary the distance covered by (i.e., the radius of) the barrier field. In some embodiments, the control interface also includes a barrier signal format selector 1316. The barrier signal format selector 1316 allows the user to change the format of the barrier signal to be understood by selected wireless radio frequency receiver collar from different electronic animal containment and/or exclusion systems. In various embodiments, selected components of the control interface 1304 are located under an access panel on the sill. In some embodiments, all components of the control interface 1304 other than the power switch are located under the access panel. In various embodiments, the gate transmitter is battery powered, and the batteries are accessible via an access panel.

The output section 1308 takes a barrier signal produced by the control unit and further processes the signal. In various embodiments, the output section 1308 includes an amplifier 1318 used to adjust the signal strength of the barrier signal based on the range selected using the range selector 1316. The area covered by (i.e., the radius of) the barrier field increases proportionally to the signal strength. A signal modulator 1320 modulates the signal to the appropriate frequency for transmission by the loop antenna 302.

Examples of suitable informational indicators 1310 include, but are not limited to, audio transducers 1322 and visual indicators 1324. Suitable audible transducers include, but are not limited to, speakers and piezoelectric elements. The audio transducers, when used, provide information using different sounds, sound patterns, and/or other distinguishable audio features to communicate information to the user. For example, a first sound may be played when the gate transmitter is turned on and another sound may be played when the gate transmitter is turned off. Suitable visual indicators include, but are not limited to, light emitting diodes (LEDs) and other lamps, liquid crystal display screens and other display screens. The visual indicators, when used, provide status indications though lamp flash sequences, colors, images, human readable content, and/or other distinguishable visual techniques. For example, a solid (i.e., non-flashing) red LED may be used to indicate the gate is closed and a solid green LED or turning the red LED off may be used to indicate the gate is open.

Figure 14:
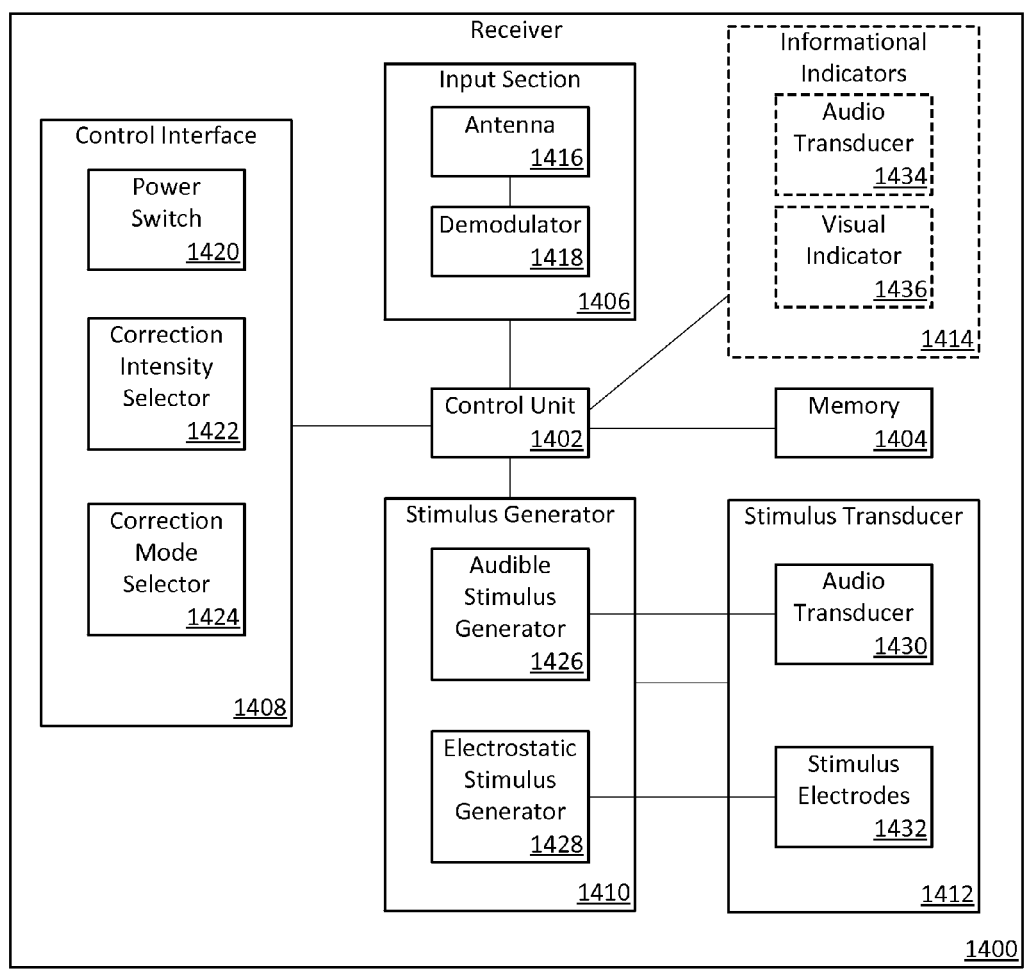
FIG. 14 is a simplified block diagram of one embodiment of a receiver collar architecture suitable for use with the electronic pet gate.

FIG. 14 is a simplified block diagram of one embodiment of the circuitry 1400 of a receiver collar suitable for use as the gate receiver 106. The receiver collar circuitry 1400 includes at least one general purpose or application specific control unit 1402, such as a central processing unit or other controller. Examples of suitable control units include, but are not limited to, microprocessors, application specific integrated circuits, field programmable gate arrays, and programmable logic devices. The control unit 1402 provides processing functions for the receiver collar 106 and, either directly or indirectly, communicates with, drives, and/or receives inputs/feedback from the other components of the gate receiver circuitry 1400. The other components of the receiver circuitry 1400 include a memory 1404, an input section 1406, a control interface 1408, a stimulus generator 1410, a stimulus delivery transducer 1412, and any optional informational indicators 1414.

The memory 1404 provides nonvolatile storage for the receiver firmware and/or software and, in some embodiments, volatile storage for information that does not need to be retained, such as operating variables. An example of a suitable memory type for nonvolatile storage is random access memory. Examples of suitable types of memory for nonvolatile storage include, but are not limited to, read only memory, programmable read only memory, electrically erasable programmable read only memory, flash memory.

The input section 1406 includes a loop antenna 1406 and a demodulator 1408. The loop antenna 1406 detects the radio frequency barrier signal. A demodulator 1408 demodulates the barrier signal for use by the control unit. The control unit processes the demodulated signal and initiates any required actions. For example, the control unit initiates the generation of a warning or correction stimulus in response to the demodulated signal.

The control interface 1408 allows the user to activate and deactivate, configure the operation of, and/or retrieve information from the receiver collar, and perform other similar functions. Examples of components of the control interface found on the receiver collar include, but are not limited to, a power switch 1420, a correction intensity selector 1422, and a correction mode selector 1424. The power switch 1420 allows the receiver collar to be turned on and off. The correction intensity selector 1422 allows the user to set the intensity level of the correction applied to the animal. The correction mode selector 1424 allows the user to configure the receiver collar to utilize different correction combinations or correction protocols. For example, the correction mode selector may be used to select between a mode that provides a warning stimulus (e.g., an audible stimulus) to the animal prior to delivering a correction stimulus and a correction only mode. In another example, the correction mode selector may be used to select between a mode where each correction stimulus has the same intensity level and a mode that increases the intensity of successive correction stimuli until the animal responds appropriately (e.g., stops barking or moves away from a containment/exclusion boundary).

The stimulus generator 1410 produces the stimulus signal applied to the animal through the stimulus transducer. The stimulus generator 1410 produces warning stimuli and/or correction stimuli. Examples of suitable stimulus generators include, but are not limited to, an audible stimulus generator 1426 (e.g., a tone generator or audio file player) and an electrostatic stimulus generator 1428. The stimulus delivery transducer transfers the stimulus signal into an output that can be experienced (e.g., seen, felt, smelled, or heard) by the animal. Examples of suitable stimulus delivery transducers include, but are not limited to, an audio transducer 1430 (e.g., a speaker or piezoelectric element) and stimulus electrodes 1432.

The optional informational indicators 1414 provide information about the status of the receiver collar (e.g., power condition, low battery, operation mode) to a human. Examples of suitable informational indicators 110 include, but are not limited to, audio transducers 1434 and visual indicators 1436. Suitable audible transducers include, but are not limited to, speakers and piezoelectric elements. The audio transducers, when used, provide information using different sounds, sound patterns, and/or other distinguishable audio features to communicate information to the user. For example, a first sound may be played when the gate transmitter is turned on and another sound may be played when the gate transmitter is turned off. Suitable visual indicators include, but are not limited to, light emitting diodes (LEDs) and other lamps, liquid crystal display screens and other display screens. The visual indicators, when used, provide status indications though lamp flash sequences, colors, images, human readable content, and/or other distinguishable visual techniques. For example, a solid (i.e., non-flashing) red LED may be used to indicate the gate is closed and a solid green LED or turning the red LED off may be used to indicate the gate is open.

Figure 15:
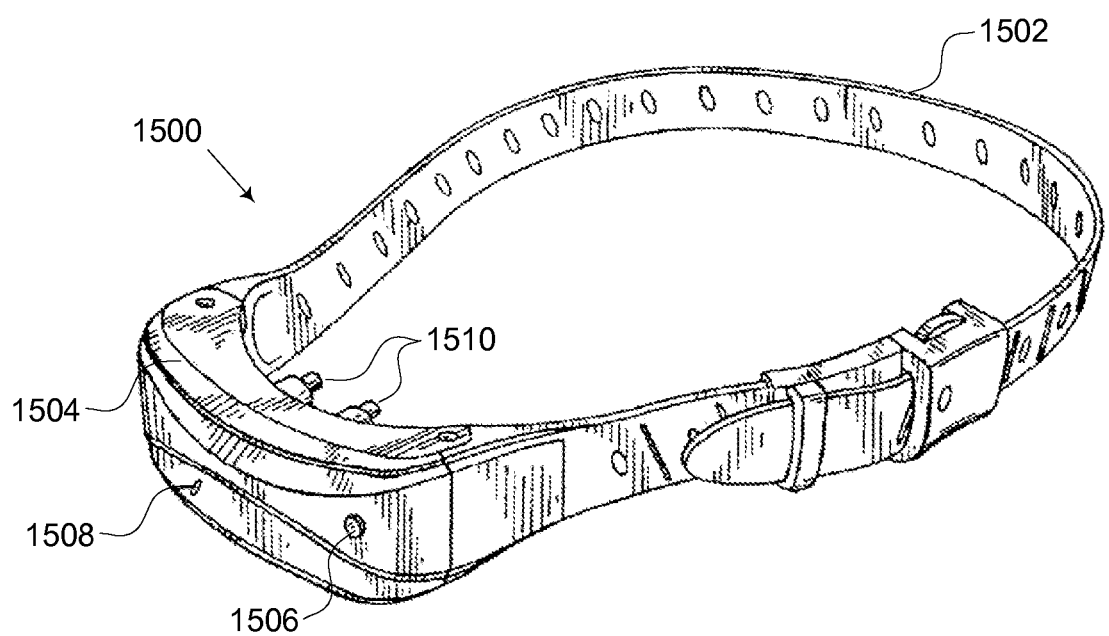
FIG. 15 is a representative drawing of one embodiment of a receiver.

FIG. 15 is a simplified block diagram of one embodiment of a receiver collar 1500 suitable for use with the electronic pet gate 100. The illustrated embodiment of the receiver collar 1500 includes a collar 1502, a housing 1504, an information indictor 1506, and a control interface 1508. The collar 1502 supports the housing 1504 and is adjustable to properly position the stimulus electrodes against the skin of the animal. The housing 1504 provides a generally waterproof enclosure for the receiver circuitry. The information indictor 1506 provides information to a user, such as information about the status of the receiver collar. The control interface 1508 is a switch that provides an input to turn the receiver collar on or off or access other functions and settings of the receiver collar. The stimulus electrodes 1510 extend from the inside face of the housing 1504 and are electrically connected to the receiver circuitry. When the receiver collar is worn by an animal, the stimulus electrodes 1510 make contact with and deliver an electrostatic correction stimulus to the skin of the animal.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

What is claimed is:

1. An electronic pet gate for use in conjunction with a receiver collar worn by an animal and capable of generating a correction stimulus, said electronic pet gate comprising:
    a sill having a length, a width, and a long axis, said length being greater than said width;
    a barrier signal generator for producing a barrier signal causing a receiver collar to apply a correction stimulus to an animal when said barrier signal is received; and
    a loop antenna in electrical communication with said barrier signal generator and transmitting said barrier signal to produce an electromagnetic field, said loop antenna connected to said sill, said loop antenna comprising:
        a pair of primary longitudinal segments substantially parallel to said long axis, said primary longitudinal segments having a length; and
        a pair of lateral transitions connecting said primary longitudinal segments, each said lateral transition comprising a plurality of antenna segments, each said lateral transition having a length greater than zero, said length of said primary longitudinal segments being substantially greater than said length of said lateral transitions.

2. The electronic pet gate of claim 1 characterized in that said length of said primary longitudinal segments is greater than twice said length of said lateral transitions.

3. The electronic pet gate of claim 1 characterized in that said loop antenna is fixed in a selected polygonal shape prior to being connected to said sill.

4. The electronic pet gate of claim 1 characterized in that said loop antenna is wound around a frame having a selected polygonal shape to form a framed polygonal loop antenna, said framed polygonal loop antenna secured to said sill.

5. The electronic pet gate of claim 4 characterized in that said sill defines a cavity sized to receive said framed polygonal loop antenna.

6. The electronic pet gate of claim 1 characterized in that said sill defines a channel, said channel comprising a pair of primary longitudinal segments substantially parallel to said long axis and a pair of lateral transitions connecting said primary longitudinal segments, each said lateral transition comprising a plurality of channel segments, said primary longitudinal segments and said lateral transitions forming a selected polygonal shape, said loop antenna secured in said channel.

7. The electronic pet gate of claim 1 characterized in that said sill further comprises a plurality of protrusions corresponding to a set of vertices for a selected polygonal shape, said loop antenna wound around said vertices to form said loop antenna into said selected polygonal shape.

8. The electronic pet gate of claim 1 characterized in that said electromagnetic barrier field has a truncated ellipsoid shape.

9. The electronic pet gate of claim 1 characterized in that said electromagnetic field is a truncated ellipsoid, said primary longitudinal segments producing an ellipsoidal shaped electromagnetic field, said lateral transitions reducing the strength of said ellipsoidal shaped electromagnetic field proximate to the edges of the ellipsoidal shape at the ends of the major axis of the ellipsoid shape.

10. The electronic pet gate of claim 1 characterized in that said electromagnetic field is a truncated ellipsoid with a major axis substantially parallel to said long axis of said sill.

11. The electronic pet gate of claim 10 characterized in that said electromagnetic field has a semi-minor axis with a selectable length ranging from approximately 0.30 m (1.0 ft) to approximately 0.91 m (3.0 ft).

12. An electronic pet gate comprising:
    a sill having a length greater its width and having a low profile, said sill configured to be securely positioned on a floor in between two door jambs;
    a barrier signal generator for producing a barrier signal;
    a loop antenna in electrical communication with said barrier signal generator and transmitting said barrier signal to produce a barrier field, said loop antenna connected to said sill, said loop antenna fixed in a selected polygonal shape;
    a receiver collar worn by an animal, said receiver collar applying a correction stimulus when the animal enters said barrier field.

13. The electronic pet gate of claim 12 characterized in that said receiver collar further comprises:
    a stimulus generator producing said correction stimulus upon receipt of said barrier signal; and a stimulus transducer in electrical communication with said stimulus generator, said stimulus transducer delivering said stimulus to the animal.

14. The electronic pet gate of claim 12 characterized in that said barrier signal generator further comprising a range control allowing adjustment of the range of said barrier field in a range of approximately 0.30 m (1.0 ft) to approximately 0.91 m (3.0 ft).

15. The electronic pet gate of claim 12 characterized in that said loop antenna is wound around a frame having a selected polygonal shape to form a framed polygonal loop antenna, said framed polygonal loop antenna secured to said sill.

16. The electronic pet gate of claim 12 characterized in that said sill defines a channel, said channel comprising a pair of longitudinal segments substantially parallel to a long axis of said sill and a pair of lateral transitions connecting said longitudinal segments, said longitudinal segments being substantially longer than said lateral transitions, said loop antenna secured in said channel.

17. The electronic pet gate of claim 12 characterized in that said longitudinal segments are at least twice as long as said lateral transitions.

18. The electronic pet gate of claim 12 characterized in that said sill further comprises a plurality of protrusions corresponding to a set of vertices for a selected polygonal shape, said loop antenna wound around said vertices to form said loop antenna into said selected polygonal shape.

19. The electronic pet gate of claim 12 characterized in that said sill fixes said loop antenna in said selected polygonal shape.

20. An electronic pet gate comprising:
a sill having a length and width, said length being greater than said width, said sill defining a channel having a generally polygonal shape;
a barrier signal generator for producing a barrier signal;
a loop antenna in electrical communication with said barrier signal generator, said loop antenna disposed in said channel to form a loop antenna having said polygonal shape, said loop antenna having longitudinal segments disposed in portions of said channel extending substantially along the length of said sill and lateral segments disposed in portions of said channel extending between said longitudinal segments, said longitudinal segments having a first length, said lateral segments having a second length, said first length being substantially greater than said second length, said loop antenna transmitting said barrier signal as an electromagnetic field, said electromagnetic field having a truncated ellipsoid; and
a gate receiver worn by an animal and responsive to said barrier signal, said gate receiver generating a deterrent stimulus when said gate receiver is sufficiently proximate to said sill to receive said barrier signal, said gate receiver comprising:
an antenna for receiving said barrier signal;
a stimulus generator in electrical communication with said loop antenna, said stimulus generator producing a stimulus upon receipt of said barrier signal; and
a stimulus transducer in electrical communication with said stimulus generator, said stimulus transducer delivering said stimulus to the animal.

* * * * *